(12) United States Patent
Miller et al.

(10) Patent No.: US 12,188,273 B1
(45) Date of Patent: Jan. 7, 2025

(54) HINGE ASSEMBLY WITH ENERGY CONTROL AND METHODS

(71) Applicant: ANDERSEN CORPORATION, Bayport, MN (US)

(72) Inventors: Chad Miller, Elk Mound, WI (US); Duane Fier, Hudson, WI (US); Jake Lopac, Lakeland, MN (US); Adam Rietz, Lake St. Croix Beach, MN (US); Csaba Andrasfi, Oakdale, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 18/219,252

(22) Filed: Jul. 7, 2023

Related U.S. Application Data

(62) Division of application No. 16/944,445, filed on Jul. 31, 2020, now Pat. No. 11,725,442.

(Continued)

(51) Int. Cl.
| | |
|---|---|
| *E05D 15/00* | (2006.01) |
| *E05D 15/30* | (2006.01) |
| *E05F 5/02* | (2006.01) |
| *F16F 1/36* | (2006.01) |
| *F16F 7/12* | (2006.01) |

(52) U.S. Cl.
CPC ............... *E05D 15/30* (2013.01); *E05F 5/02* (2013.01); *F16F 1/36* (2013.01); *F16F 7/12* (2013.01); *E05Y 2900/148* (2013.01); *F16F 2224/0208* (2013.01); *F16F 2224/025* (2013.01)

(58) Field of Classification Search
CPC ............... Y10T 16/545; Y10T 16/5453; Y10T 16/5457; Y10T 16/547; Y10T 16/6298; Y10T 16/551; Y10T 16/544; Y10T 16/5445; Y10T 16/5448; Y10T 16/5323; E05Y 2900/31; E05Y 2900/148; E05Y 2800/696; E05Y 2201/628; E05Y 2201/638; E05Y 2201/686; E05Y 2201/716; E05D 3/15; E05D 15/30; E05D 15/406; E05D 15/408; E05D 15/42; E05D 15/44; E05D 15/16; E05D 15/165; E05D 15/581; E05D 15/58; E05D 3/18; E05D 13/08; E05D 13/10; F25D 23/028; E05F 11/00; E05F 11/34; E05F 5/02;

(Continued)

(56) References Cited

U.S. PATENT DOCUMENTS

| | | | |
|---|---|---|---|
| 5,450,654 A | 9/1995 | Sullivan | E05C 17/32 16/370 |
| 5,491,930 A | 2/1996 | La See | |

(Continued)

FOREIGN PATENT DOCUMENTS

| | | | | |
|---|---|---|---|---|
| CN | 203603660 U | 5/2014 | ............ | E05D 15/30 |
| CN | 104265102 B | 9/2016 | ........... | E05D 11/087 |

*Primary Examiner* — Chuck Y Mah
(74) *Attorney, Agent, or Firm* — Mueting Raasch Group

(57) ABSTRACT

Window hinge assemblies with energy control and methods of using the same are described herein. The hinge assemblies include a track assembly, a shoe slidably engaged in a shoe track of the track assembly, a sash arm configured for attachment to a rotating sash, the sash arm being pivotally attached to the shoe, and a connecting arm pivotally connected to both the track assembly and the sash arm. The track assembly includes a base extending along a track axis, a shoe track extending along the track axis, and one or more energy control structures associated with the sash arm.

13 Claims, 7 Drawing Sheets

Related U.S. Application Data

(60) Provisional application No. 62/882,800, filed on Aug. 5, 2019.

(58) Field of Classification Search
CPC .......... F16F 1/36; F16F 7/12; F16F 2224/025; F16F 2224/0208
See application file for complete search history.

(56) References Cited

U.S. PATENT DOCUMENTS

| | | | |
|---|---|---|---|
| 6,112,371 A | 9/2000 | Tremblay | |
| 6,134,751 A | 10/2000 | Carrier et al. | |
| 6,643,896 B2 | 11/2003 | Carrier | |
| 7,735,194 B2 | 6/2010 | Bruzek | |
| 8,468,656 B2 | 6/2013 | Bauman et al. | |
| 8,495,797 B2 | 7/2013 | La See | E05D 15/30 16/362 |
| 11,002,055 B2 | 5/2021 | Eickhoff | E05F 3/227 |
| 2004/0055113 A1 | 3/2004 | Tremblay | E05D 7/04 16/319 |
| 2007/0289096 A1 | 12/2007 | Zhang | E05D 5/125 16/273 |
| 2009/0044377 A1 | 2/2009 | Liang | E05D 15/30 16/354 |
| 2019/0368253 A1 | 12/2019 | Mcgregor | E05F 3/12 |

HINGE ASSEMBLY WITH ENERGY CONTROL AND METHODS

RELATED APPLICATION

This application is a divisional application of U.S. patent application Ser. No. 16/944,445, filed Jul. 31, 2020, which claims the benefit under 35 U.S.C. Section 119 of U.S. Provisional Patent Application No. 62/882,800 entitled "HINGE ASSEMBLY WITH ENERGY CONTROL AND METHODS" and filed on Aug. 5, 2019, the disclosures of which are incorporated herein by reference in their entireties.

Window hinge assemblies with energy control and methods of using the same are described herein.

BACKGROUND

Casement windows include a frame mounted in a rough opening provided in a structure, with at least one sash mounted for rotation within the window frame, the sash being movable between open and closed positions within the window frame.

The sashes in such windows are mounted on hinge assemblies to allow for rotation of the sash within the window frame. Those hinge assemblies may include a track attached to the window frame and a sash arm attached to the sash. One end of the sash arm is attached to a shoe that slides along the track, with the sash arm being pivotally attached to the shoe. The hinge assembly further includes a connecting arm pivotally attached to both the track and the sash arm. As the sash rotates from a closed position to an open position, the shoe slides along the track while the connecting arm rotates around a hinge pin positioned in the window frame. Some examples of such known hinge assemblies for casement windows may be found in, for example, U.S. Pat. Nos. 5,491,930; 6,112,371; 6,134,751; 6,643,896; 7,735,194; and 8,468,656.

SUMMARY

Window hinge assemblies with energy control and methods of using the same are described herein. In one or more embodiments, the hinge assemblies include a track assembly, a shoe slidably engaged in a shoe track of the track assembly, a sash arm configured for attachment to a rotating sash, the sash arm being pivotally attached to the shoe, and a connecting arm pivotally connected to both the track assembly and the sash arm. The track assembly includes a base extending along a track axis, a shoe track extending along the track axis, and one or more energy control structures associated with the sash arm.

One potential advantage of one or more embodiments of hinge assemblies as described herein is that controlling/absorbing energy transmitted by the sash into the hinge assembly through, e.g., the sash arm can reduce the likelihood of damage to the hinge pin when the sash of the window is in a closed position within the frame of the window. When the sash is in, for example, a closed position, forces acting on the window sash through the frame or directly on the sash and directed along the sash arm can be transmitted to the hinge pin through the connecting arm and the sash arm. Those forces can damage the hinge pins.

Controlling energy transmitted into the hinge assembly by the sash can reduce the likelihood of damage to the hinge pin of the hinge assembly when, for example, the window unit is subjected to drops and other types of full window/sash impacts during transportation of the window unit from the assembly factory to the building rough opening into which it is installed. Controlling energy transmitted into the hinge assembly by the sash through the sash arm can also reduce the likelihood of damage to a hinge pin when the sash is in an open position and subject to forces from, for example, wind gusts, which may be transmitted through the hinge assembly to the hinge pin, thereby damaging the hinge pin.

In one or more embodiments of the hinge assemblies described herein, energy control may be achieved through energy control components configured to deform in response to a compressive force directed along the sash arm when the hinge assembly is in a closed configuration. The energy control components contained in such hinge assemblies absorb the energy that would otherwise typically be delivered to the hinge pin. In one or more embodiments, energy control may be accomplished through the use of one or more resilient components capable of recovering along one or more dimensions after being compressed. In one or more embodiments, energy control may be accomplished through features that permanently deform in response to compressive forces directed along a sash arm. In one or more embodiments, both elastic and permanent deformation may occur in response to compressive forces directed along the sash arm to control energy in one or more embodiments of the hinge assemblies described herein.

In one or more alternative embodiments of hinge assemblies described herein, energy control within the hinge assembly may be achieved through transfer of energy from the sash arm to the shoe track using a mechanical interlock between the sash arm and shoe track when the hinge assembly is in the closed configuration. Transferring energy from the sash arm to the shoe track results in transfer of that energy to the window frame rather than the hinge pin.

In a first aspect, one or more embodiments of a hinge assembly for supporting a rotating sash in a window frame as described herein may include: a track assembly configured for attachment to a window frame, the track assembly comprising a base, a shoe track, and a hinge pin, wherein the base extends along a track axis from a hinge pin end to a shoe track end, wherein the shoe track extends along the track axis, and wherein the shoe track extends from the shoe track end towards the hinge pin end, wherein the hinge pin is connected to the base, the hinge pin defining a hinge pin axis extending through the base end and the upper end of the hinge pin. The hinge assembly may further include a shoe slidably engaged with the shoe track, wherein the shoe is configured to slide along the shoe track end the shoe is restrained from moving transverse to the track axis when the shoe is slidably engaged with the shoe track; a sash arm configured for attachment to a rotating sash, the sash arm extending from a shoe end to a distal end, wherein the shoe end forms a pivotal connection to the shoe, and wherein the sash arm defines a sash arm axis extending through the shoe end and the distal end; and a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin, wherein the hinge pin end of the connecting arm is located between the hinge pin support and the base of the track assembly. The hinge assembly comprises a closed configuration in which the sash arm axis is aligned with the track axis and an open configuration. The sash arm further comprises one or more energy control components configured to deform in response to a compressive force directed along the sash arm axis when the hinge assembly is in the closed configuration.

In one or more embodiments, the sash arm comprises a base extending along the sash arm axis and a sliding element attached to the base, wherein the base is configured for fixed attachment to a rotating sash and the sliding element is configured for sliding movement along the sash arm axis relative to the base, and wherein the one or more energy control components comprises a resilient bumper positioned such that movement of the sliding element in at least one direction along the sash arm axis is constrained by the resilient bumper.

In one or more embodiments, the sash arm comprises a base extending along the sash arm axis and a sliding element attached to the base, wherein the base is configured for fixed attachment to a rotating sash and the sliding element is configured for sliding movement along the sash arm axis relative to the base, and wherein the one or more energy control components comprises a pair of resilient bumpers positioned such that movement of the sliding element along the sash arm axis towards or away from the hinge pin is constrained by at least one resilient bumper of the pair of resilient bumpers.

In one or more embodiments of a hinge assembly including a resilient bumper, the resilient bumper comprises an elastomeric body.

In one or more embodiments of a hinge assembly including a resilient bumper, the resilient bumper is attached to the base.

In one or more embodiments of a hinge assembly including a resilient bumper, the base comprises a housing defining a channel extending along the sash arm axis and the sliding element comprises a sliding core located in the channel, wherein the sliding core is configured for sliding movement in the channel along the sash arm axis.

In one or more embodiments, the sash end of the connecting arm is pivotally attached to the sash arm by a pin, wherein the pin is contained within a bushing assembly extending through the sash arm, the bushing assembly comprising the one or more energy control components and a bushing core, wherein the pin extends through the bushing core.

In one or more embodiments of a hinge assembly including a bushing assembly, the one or more energy control components comprises an elastomeric body surrounding the bushing core. In one or more embodiments, the bushing core comprises a metallic bushing core.

In one or more embodiments of a hinge assembly including a bushing assembly, the bushing assembly comprises a non-circular bushing assembly defining a major axis aligned with the sash arm axis. In one or more embodiments, the bushing core is centered along the sash arm axis within the non-circular bushing assembly.

In one or more embodiments of a hinge assembly as described herein, the one or more energy control components comprises a sacrificial zone configured to permanently deform in response to a compressive force directed along the sash arm axis when the hinge assembly is in the closed configuration.

In one or more embodiments of a hinge assembly as described herein including a sacrificial zone, the sash end of the connecting arm is pivotally connected to the sash arm within the sacrificial zone.

In one or more embodiments of a hinge assembly as described herein including a sacrificial zone, the sacrificial zone comprises a first cross-sectional area that is smaller than a second cross-sectional area of the sash arm outside of the sacrificial zone, where the first and second cross-sectional areas are measured in planes transverse to the sash arm axis.

In one or more embodiments of a hinge assembly as described herein including a sacrificial zone, the sash arm comprises one or more stress-concentration features within the sacrificial zone. In one or more embodiments, at least one stress concentration feature of the one or more stress concentration features comprises a shoulder formed along an edge of the sash arm. In one or more embodiments, at least one stress concentration feature of the one or more stress concentration features comprises a notch formed into the sash arm within the sacrificial zone.

In a second aspect, one or more embodiments of a hinge assembly for supporting a rotating sash in a window frame as described herein includes: a track assembly configured for attachment to a window frame, the track assembly comprising a base, a shoe track, and a hinge pin, wherein the base extends along a track axis from a hinge pin end to a shoe track end, wherein the shoe track extends along the track axis, and wherein the shoe track extends from the shoe track end towards the hinge pin end, wherein the hinge pin is connected to the base, the hinge pin defining a hinge pin axis extending through the hinge pin. The hinge assembly further includes a shoe slidably engaged with the shoe track, wherein the shoe is configured to slide along the shoe track end the shoe is restrained from moving transverse to the track axis when the shoe is slidably engaged with the shoe track; a sash arm configured for attachment to a rotating sash, the sash arm extending from a shoe end to a distal end, wherein the shoe end is pivotally coupled to the shoe, and wherein the sash arm defines a sash arm axis extending through the shoe end and the distal end; and a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin, wherein the hinge pin end of the connecting arm is located between the hinge pin support and the base of the track assembly. The hinge assembly comprises a closed configuration in which the sash arm axis is aligned with the track axis and an open configuration, with the sash arm and the shoe track defining a mechanical interlock configured to fix the position of the sash arm relative to the shoe track along the sash arm axis and the track axis when the hinge assembly is in the closed configuration such that a force directed along the sash arm axis through the sash arm is transferred from the sash arm to the shoe track at the mechanical interlock.

In one or more embodiments of a hinge assembly as described herein including a mechanical interlock configured to fix the position of the sash arm relative to the shoe track along the sash arm axis and the track axis when the hinge assembly is in the closed configuration, the mechanical interlock comprises a complementary slot and tab arrangement, wherein the tab is located in the slot when the hinge assembly is in the closed configuration and wherein the tab is not located in the slot when the hinge assembly is in the open configuration. In one or more embodiments, the tab is attached to the sash arm and the slot is formed in the shoe track.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the hinge assemblies and methods of using the same as described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
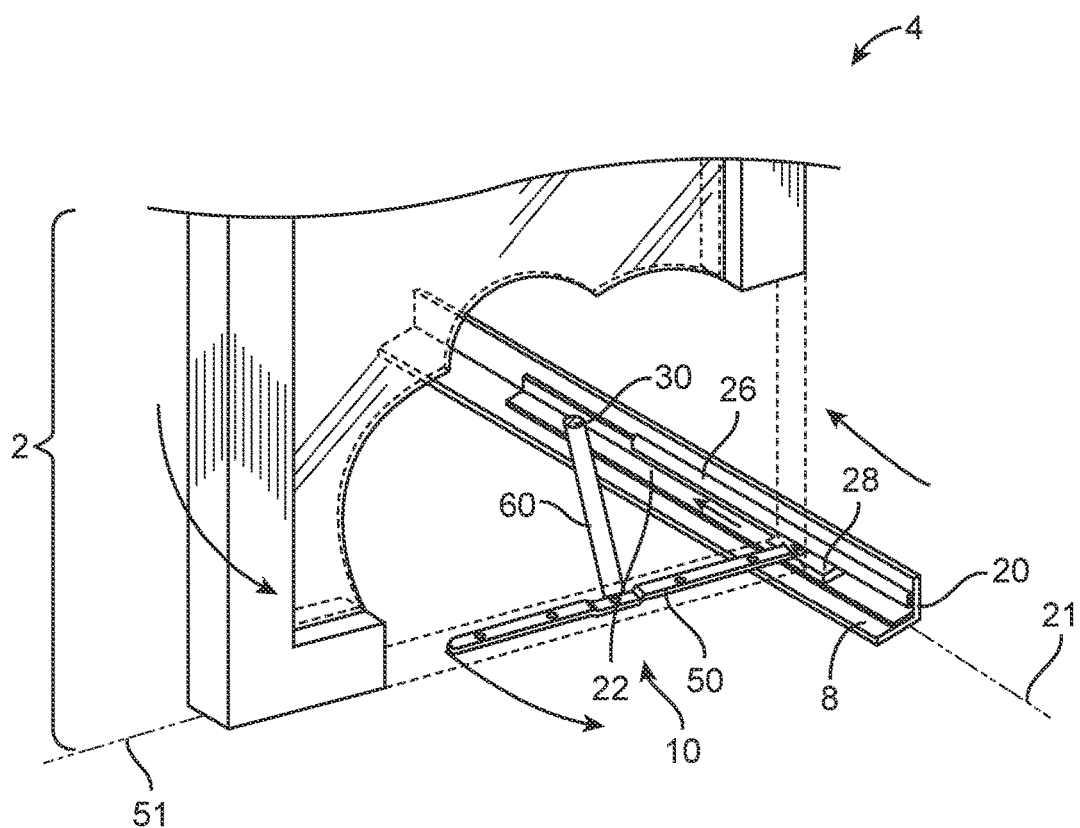
FIG. 1 is a perspective view of one illustrative embodiment of a hinged window incorporating one illustrative embodiment of a hinge assembly as described herein (portions of the sash being removed to facilitate viewing of the hinge assembly and the window frame).

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The hinge assemblies described herein may be used with windows having one or more rotating sashes in a window frame, with each rotating sash being supported by at least one hinge assembly to control rotation of the sash relative to the frame. Some examples of windows with which the hinge assemblies described herein may be used include casement windows, awning windows, French casement windows, hopper windows, tilt-turn windows, pivot windows, utility windows, etc.

One illustrative embodiment of a portion of a casement window is depicted in the perspective view of FIG. 1. The casement window 2 includes a rotating sash 4 mounted in a frame including a frame member 8. The rotating sash 4 is supported at its bottom end by a hinge assembly 10, with the hinge assembly 10 being attached to a frame member 8 of the window frame in which the rotating sash 4 is located. Although not depicted, it will be understood that the sash 4 is also typically supported at its top end by a second hinge assembly.

Figure 2:
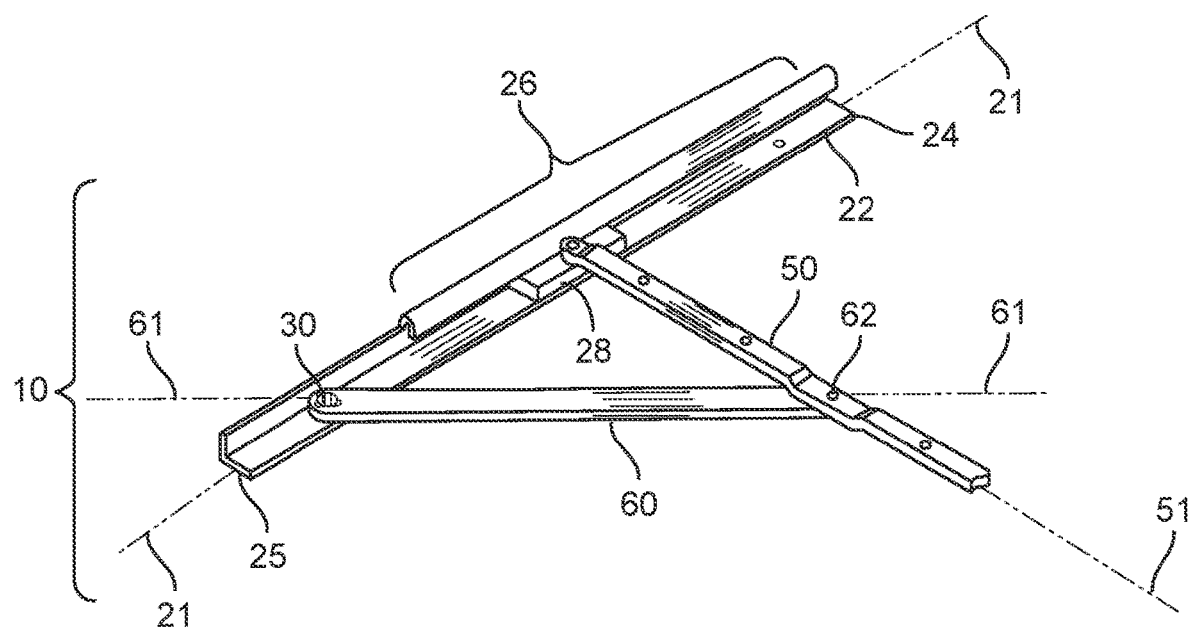
FIG. 2 is a perspective view depicting the hinge assembly of FIG. 1 in isolation from the window frame and sash depicted in FIG. 1.

The hinge assembly 10, which is depicted as isolated or removed from the sash 4 and window frame member 8 in FIG. 2, includes a track assembly 20, sash arm 50, and connecting arm 60. The hinge assembly 10 is, in many respects, similar to typical hinge assemblies used to support rotating sashes in casement windows. For example, the track assembly 20 includes a base 22 and a shoe track 26, with shoe 28 being slidably engaged with the shoe track 26 as known in conventional casement window hinge assemblies.

The base 22 of track assembly 20 includes a shoe track end 24 and a hinge pin end 25, with the base 22 extending between the shoe track end 24 and the hinge pin end 25 along track axis 21. The shoe track 26 is also aligned with and extends along the track axis 21, with the shoe track 26 extending from the shoe track end 24 of the base 22 towards the hinge pin end 25 of the base 22. Typically, the shoe track 26 will not extend along the base 22 to the hinge pin end 25 and may, therefore, be described as occupying only a portion of the base 22 of the track assembly 20.

Sash arm 50 is, in the depicted illustrative embodiment, attached to the bottom 6 of the sash 4 and pivotally connected to the shoe 28 to both support and control movement of the sash relative to the window frame (e.g., window frame member 8) during opening and closing of the sash 4. Sash arm 50 extends along and defines a sash arm axis 51.

Connecting arm 60 is pivotally connected to both the sash arm 50 and a hinge pin 30 of the track assembly 20 to further control movement of the sash arm 50 and, therefore, sash 4 relative to the window frame (e.g., window frame member 8) as the sash 4 is opened and closed. Connecting arm 60 extends along and defines a connecting arm axis 61.

In one or more embodiments, the connecting arm 60 may be described as extending from a hinge pin end pivotally connected to the hinge pin 30 and a sash end pivotally connected to the sash arm 50 through pin 62. The pin 62 it is located at an intermediate location spaced from the shoe end of the sash arm 50 such that the sash end of the connecting arm 60 is pivotally connected to the sash arm 50 at an intermediate location spaced from the shoe end of the sash arm 50.

The pivotal connection between sash arm 50 and the shoe 28 along with the pivotal connections of the connecting arm 60 to both the hinge pin 30 and the sash arm 50 allow sash 4 to rotate as the sash is opened and closed, with the shoe 28 sliding along shoe track 26 during opening and closing of the sash 4. As also known in conventional hinge assemblies used in, e.g., casement windows, the shoe 28 engages the shoe track 26 such that the shoe 28 is restrained from moving transverse to the track axis 21 defined by the base 22 of the track assembly 20 as the shoe 28 slides along shoe track 26.

The hinge assembly 10 as depicted in FIG. 2 is in an open configuration in which a sash connected to the sash arm 50 would be in an open position relative to a window frame. In one or more embodiments of the hinge assemblies described herein, the hinge assembly may be described as being in an open configuration when the sash arm axis 51 and the track axis 21 form an included angle of 10 degrees or more, 15 degrees or more, or even 20 degrees or more at the pivotal connection between the shoe end of the sash arm and the shoe 28 (with the connecting arm axis 61 forming the third leg of the triangle in which the included angle is located).

Figure 3:
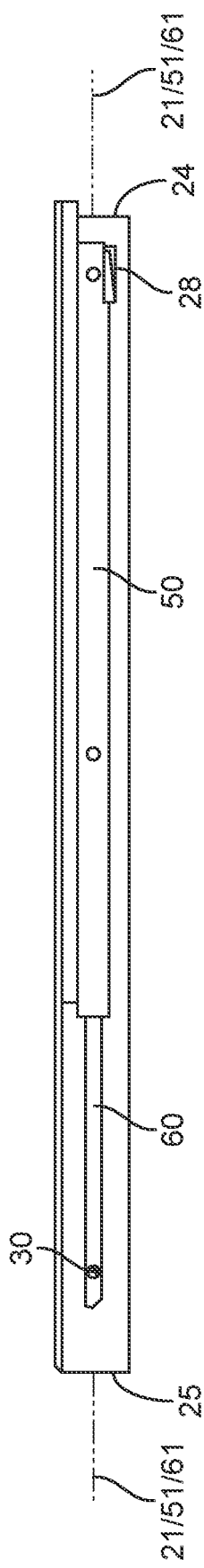
FIG. 3 is a top view of the components of the hinge assembly of FIG. 2 when the sash is in a closed position such that the sash arm 50 and connecting arm 60 are aligned along the track axis 21.

FIG. 3 depicts the components of the hinge assembly 10 of FIG. 2 as arranged when a sash connected to the hinge assembly 10 would be in a closed configuration relative to a window frame.

As depicted in FIG. 3, the sash arm 50 and connecting arm 60 are rotated relative to their positions in FIG. 2 such that the sash arm 50 and connecting arm 60 are generally aligned with the track axis 21 when the hinge assembly is in the closed configuration. As a result, in one or more embodiments the sash arm axis 51 and the connecting arm axis 61 are aligned with the track axis 21 as depicted in connection with the illustrative embodiment of hinge assembly 10 of FIG. 3. Although depicted as perfectly aligned, some misalignment between the different axes may be acceptable when the sash to which the hinge assembly is attached is in its closed configuration.

Figure 4:
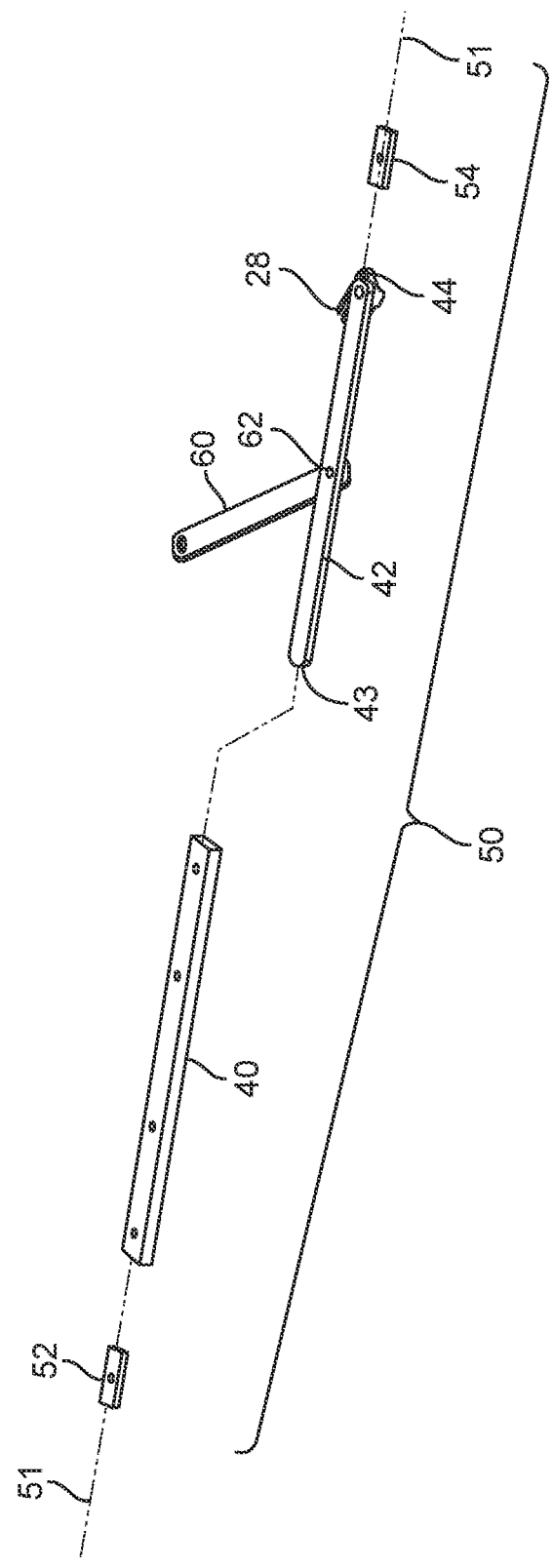
FIG. 4 is an exploded diagram depicting components of the sash arm used in the hinge assembly depicted in FIGS. 2-3.
Figure 5:
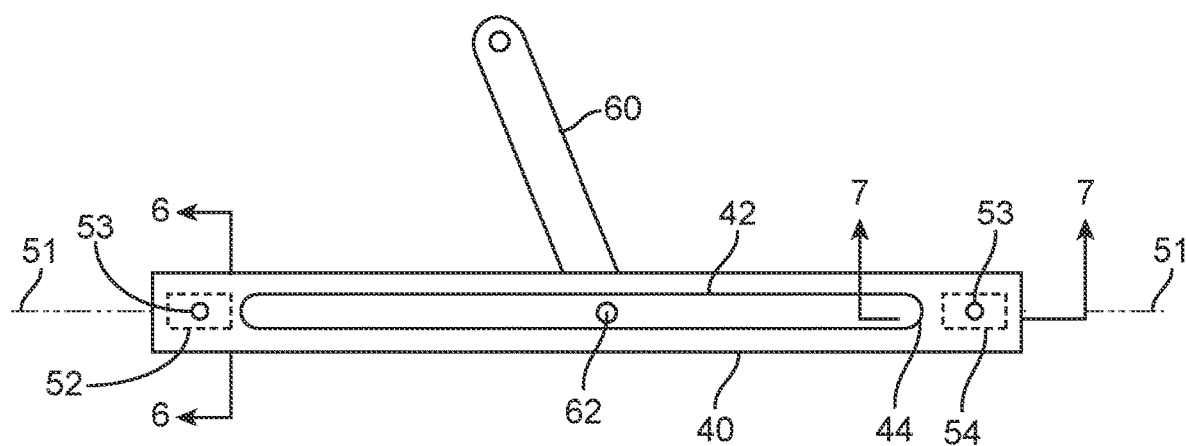
FIG. 5 it is a top view of the sash arm depicted in FIG. 4 with the components of the sash arm assembled.
Figure 6:
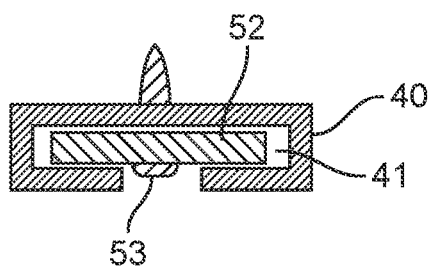
FIG. 6 is an enlarged cross-sectional view of the sash arm of FIG. 5 taken along line 6-6 in FIG. 5.
Figure 7:
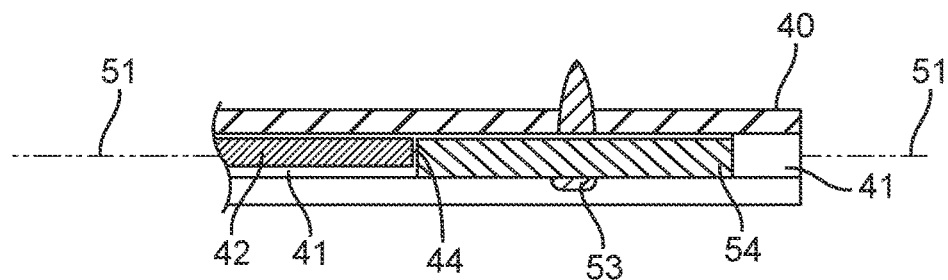
FIG. 7 is an enlarged cross-sectional view of the sash arm of FIG. 5 taken along line 7-7 in FIG. 5.

The illustrative embodiment of sash arm 50 is depicted in an exploded diagram in FIG. 4, along with connecting arm 60 attached to the sash arm 50 at pin 62 as described above. The components of the sash arm 50 are depicted as assembled in FIG. 5 with the cross-sections depicted in FIGS. 6-7 of the sash arm being taken at two different locations along sash arm 50. Sash arm 50 includes a base 40 and a sliding element 42 attached to the base 40. The base 40 is configured for fixed attachment to the rotating sash 4 of window 2. The sliding element 42 is configured for sliding movement along the sash arm axis 51 relative to the base 40 which, as described herein, is fixedly attached to the sash.

In the depicted illustrative embodiment, sash arm 50 includes a pair of resilient bumpers 52, 54 located on opposite ends of the sash arm 50. The resilient bumpers 52, 54 are positioned such that movement of the sliding element 42 of sash arm 50 relative to the base 40 along the sash arm axis 51 is constrained. In particular, movement of end 43 of sliding element 42 towards the hinge pin 30 is constrained by bumper 52 located between the sliding element 42 and hinge pin 30. At the opposite end of sash arm 50, movement of end 44 of sliding element 42 away from the hinge pin 30 is constrained by bumper 54.

In one or more embodiments, resilient bumpers 52, 54 may be constructed of any suitable resilient material or combinations of materials that reduce the amplitude and extend the time period of a high energy input (e.g., an impact force) and that may also dampen or control oscillation of the system being impacted. Some suitable materials may be described as exhibiting elastomeric properties such as, e.g., plastics, rubbers, silicones, etc. In one or more embodiments, the durometer of elastomeric materials used to form the resilient bumpers may be relatively high, e.g., in one or more embodiments, the Shore A durometer of elastomeric materials used to form resilient bumpers in hinge assemblies as described herein may be in the range of 80-90.

Although resilient bumpers 52, 54 may be in the form of elastomeric bodies, in one or more alternative embodiments, resilient bumpers of hinge assemblies as described herein may take any number of a variety of different forms, e.g., coil springs, leaf springs, dashpots, shock absorbers including pistons, etc. and combinations of one or more of any of these different options provided that the resulting resilient bumper be capable of absorbing energy directed along the sash arm anticipating that energy before it reaches a hinge pin to reduce the likelihood of damage to hinge pins as described herein.

Further, although the depicted illustrative embodiment of sash arm 50 includes a pair of resilient bumpers 52, 54, one or more alternative embodiments of hinge assemblies as described herein may include only one resilient bumper. For example, in one or more embodiments of hinge assemblies as described herein, sash arm 50 may include only a resilient bumper 52 located between sliding element 42 and hinge pin 30 to absorb compressive forces directed along the sash arm 50 towards the hinge pin 30.

The depicted illustrative embodiment of a sash arm 50 may be more particularly described as having a base 40 in the form of a housing defining a channel (see, e.g., channel 41 in FIGS. 6-7) extending along the sash arm axis 51, with the sliding element 42 located in the channel 41 formed by the housing of base 40. As described herein, the sliding core/sliding element 42 is configured for sliding movement in the channel 41 along the sash arm axis 51. As such, the housing/channel configuration of the base 40 and complementary profile of sliding element 42 are only one example of potentially suitable combinations of structures that allow for sliding movement of a sliding element within a base fixed on a sash supported by a hinge assembly as described herein.

In still other alternative embodiments, although resilient bumpers 52, 54 are depicted as being separate from sliding element 42 and attached to the base 40 (by, e.g., fasteners 53—see FIGS. 5-7), in one or more alternative embodiments, resilient bumpers may be incorporated on one or both ends 43, 44 of sliding element 42 with suitable mechanical stops being incorporated into the base 40. In such an arrangement, energy absorption would occur when the resilient bumpers incorporated onto the ends of the sliding element 42 act against the mechanical stops incorporated into the base 40.

Figure 8:
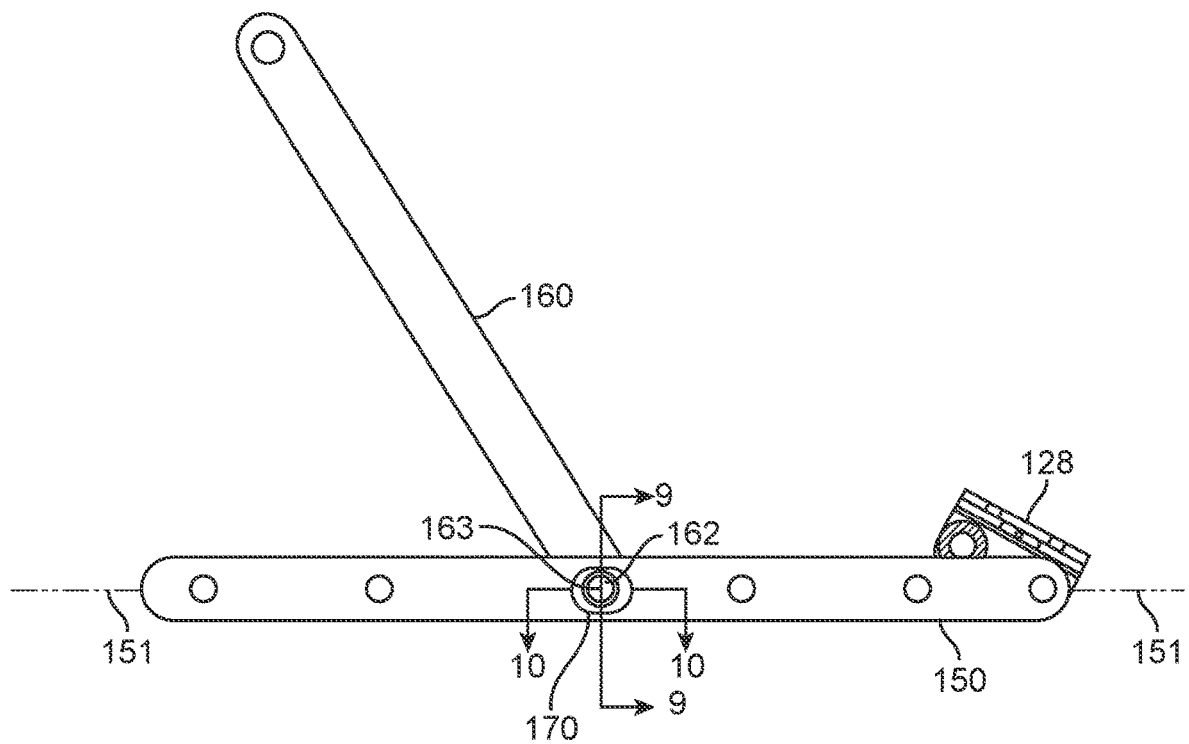
FIG. 8 is a top view of another illustrative embodiment of a sash arm that may be used in one or more embodiments of a hinge assembly as described herein.
Figure 9:
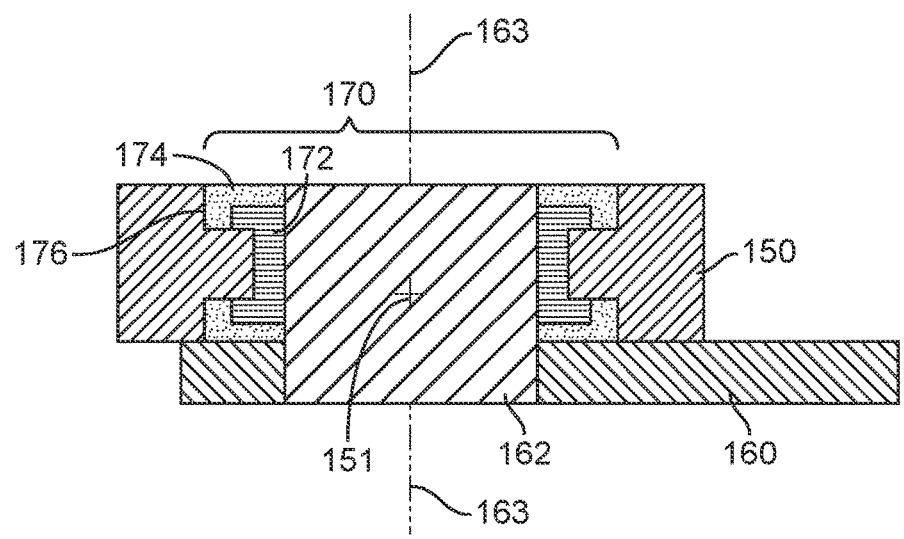
FIG. 9 is an enlarged cross-sectional view of one illustrative embodiment of a bushing including an energy control component used at the pivotal connection between the sash arm and connecting arm of the sash arm of FIG. 8 taken along line 9-9 in FIG. 8.
Figure 10:
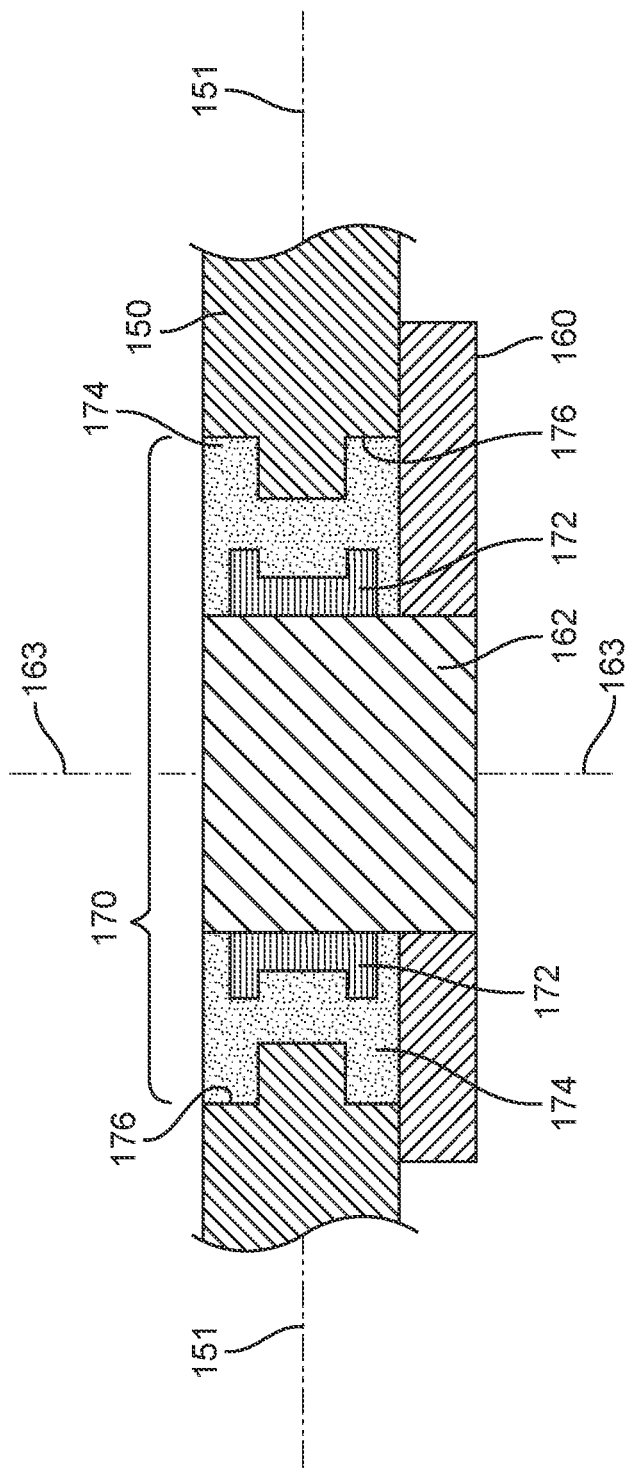
FIG. 10 is an enlarged cross-sectional view of the pivotal connection between the sash arm and connecting arm of the sash arm of FIG. 8 taken along line 10-10 in FIG. 8.

One alternative illustrative embodiment of a sash arm that may be used in one or more embodiments of hinge assemblies as described herein is depicted in combination with a connecting arm in FIGS. 8-10. The depicted illustrative embodiment of sash arm 150 includes one or more energy control components in a bushing assembly 170 at the pivotal connection between the sash end of the connecting arm 160 and the sash arm 150.

As described in connection with other embodiments herein, the sash arm 150 extends along a sash arm axis 151 in includes a shoe 128 at one end thereof, with the shoe 128 being pivotally connected to the shoe end of the sash arm 150. The sash end of the connecting arm 160 is pivotally attached to the sash arm 150 by a pin 162. The pin 162 is contained within the bushing assembly 170 that extends through the sash arm 150.

In the depicted illustrative embodiment, the bushing assembly 170 includes the one or more energy control components and a bushing core 172, with the pin 162 extending through the bushing core 172 such that the pin 162 defines an axis 163 about which connecting arm 160 and sash arm 150 rotate relative to each other during opening and closing of the hinge assembly incorporating sash arm 150 and connecting arm 160.

In the depicted illustrative embodiment of bushing assembly 170, the one or more energy control components of bushing assembly 170 may be in the form of an elastomeric body 174 surrounding the bushing core 172. The elastomeric body 174 may be constructed of one or more materials described above in connection with elastomeric materials that may be used with resilient bumpers 52, 54.

In one or more embodiments, bushing core 172 may be constructed of metallic materials or, at a minimum, materials that are stiffer than the materials used for the energy control components of bushing assembly 170.

In one or more embodiments, the bushing assembly 170 may be described as a noncircular bushing assembly that defines a major axis aligned with the sash arm axis 151. One example of such a noncircular bushing assembly having a major axis can be seen in the two different cross-sectional views of illustrative embodiment of noncircular bushing assembly 170. In the depicted illustrative embodiment, the bushing core 172 is centered along the sash arm axis 151 within the noncircular bushing assembly 170, although that arrangement is not required in all embodiments (e.g., elastomeric material may be preferentially provided on one side of the bushing assembly 170 within opening 176 in sash arm 150.

In particular, FIG. 9 (a cross-sectional view taken along line 9-9 in FIG. 8) depicts a complementary shape between opening 176 in sash arm 150 and bushing core 172 in which the bushing core 172 is restricted from movement along directions transverse to the sash arm axis 151 and the axis 163 defined by pin 162. As a result, bushing core 172 may slide along sash arm axis 151, but is generally restricted from moving transverse to that axis.

In contrast, FIG. 10 (a cross-sectional view taken along line 10-10 in FIG. 8) depicts an arrangement in which the elastomeric body 174 is located between bushing core 172 and opening 176 in sash arm 150. As a result, the energy from forces directed along sash arm axis 151 may be at least partially absorbed by the resilient elastomeric body 174 of bushing assembly 170 as pin 162 and bushing core 172 move within the elastomeric body 174 along sash arm axis 151.

Figure 11:
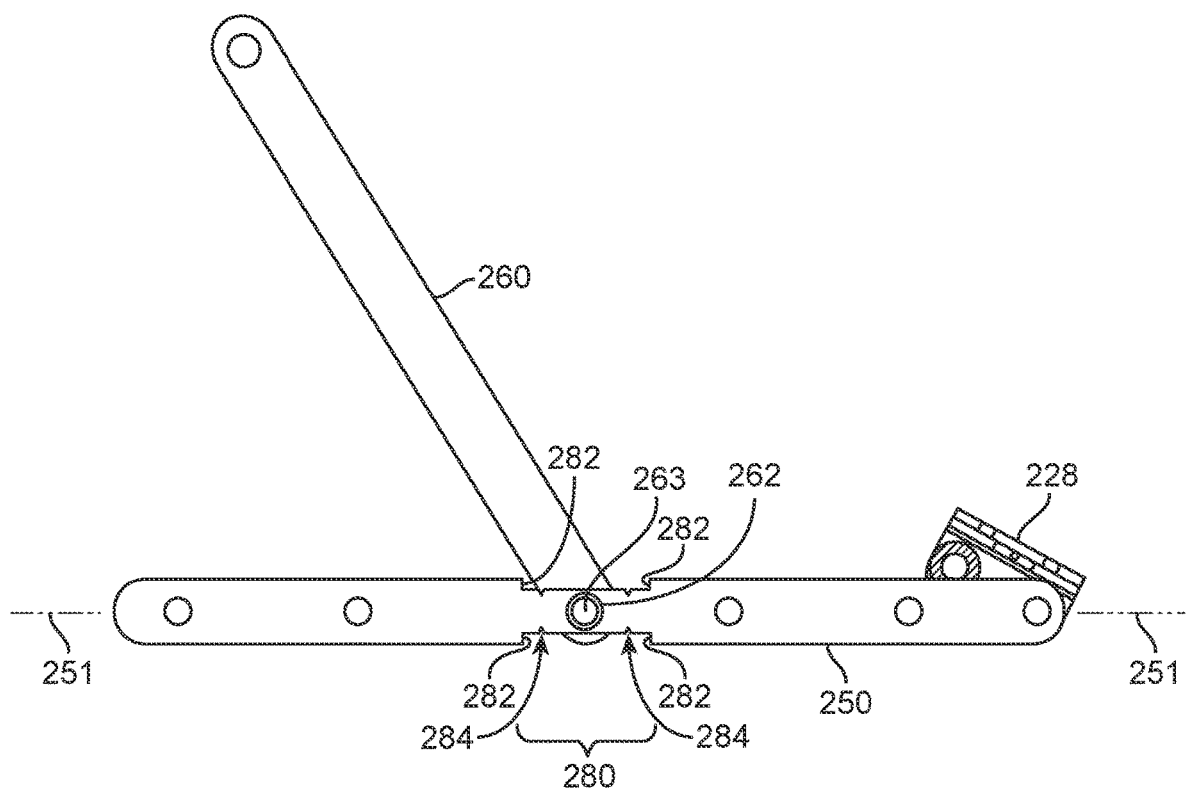
FIG. 11 is a top view of another illustrative embodiment of a sash arm and connecting arm that may be used in one or more embodiments of a hinge assembly as described herein.
Figure 12:
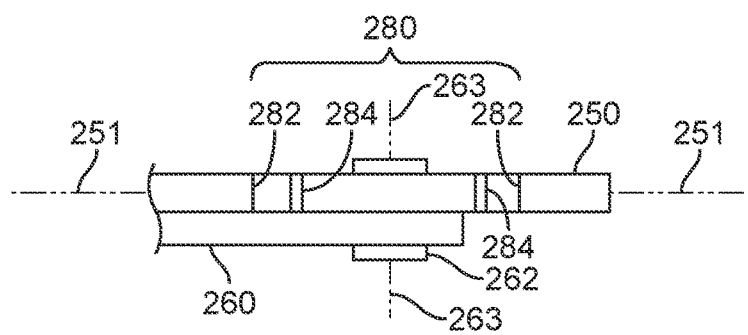
FIG. 12 is an enlarged side view of the portion of the sash arm of FIG. 11 to which the connecting arm is attached.
Figure 13:
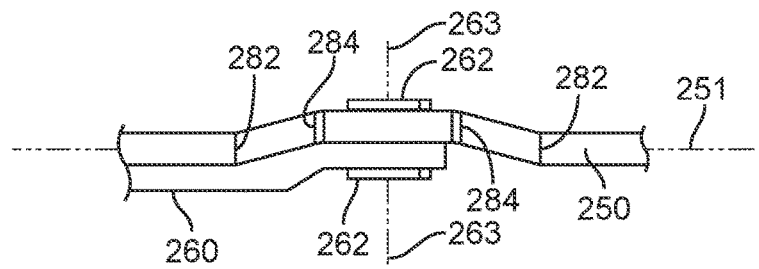
FIG. 13 is an enlarged side view of the portion of the sash arm of FIG. 11 to which the connecting arm is attached after deformation of the sash arm due to forces transmitted along the sash arm axis.

Another alternative illustrative embodiment of a sash arm that may be used in one or more embodiments of hinge assemblies as described herein is depicted in combination with a connecting arm in FIGS. 11-13. The depicted illustrative embodiment of sash arm 250 includes one or more energy control components in a sacrificial zone that is configured to permanently deform in response to a compressive force directed along the sash arm axis.

As described in connection with other embodiments herein, the sash arm 250 extends along a sash arm axis 251 in includes a shoe 228 at one end thereof, with the shoe 228 being pivotally connected to the shoe end of the sash arm 250. The sash end of the connecting arm 260 is pivotally attached to the sash arm 250 by a pin 262.

The depicted illustrative embodiment of sash arm 250 includes a sacrificial zone 280 that is configured to permanently deform in response to a compressive force directed along the sash arm axis 251 when the hinge assembly is in a closed configuration. The pin 262 used to pivotally connect the connecting arm 260 and sash arm 250 is, in the depicted illustrative embodiment located within the sacrificial zone 280, although in one or more alternative embodiments, the pivotal connection between sash arm 250 and connecting arm 260 may not be located within the sacrificial zone 280. Placing the pivotal connection between sash arm 250 and connecting arm 260 in the sacrificial zone 280 may, however, provide energy control protection for a hinge pin from compressive forces in either direction along the sash arm axis 251.

Permanent deformation of the sacrificial zone 280 of sash arm 250 can be seen in a comparison of FIGS. 12-13. FIG. 12 depicts a portion of the sash arm 250 including the sacrificial zone 280 before permanent deformation of the sacrificial zone 280 occurs, while FIG. 13 depicts a permanently deform sacrificial zone 280 of sash arm 250.

The depicted illustrative embodiment of sacrificial zone 280 may be described as having a cross-sectional area that is smaller than a cross-sectional area of the sash arm 250 outside of the sacrificial zone 280 (with those cross-sections being measured in planes transverse to the sash arm axis 251). The smaller cross-sectional area of the sacrificial zone 280 may result in preferential deformation of the sash arm 250 within the sacrificial zone 280 as compared to portions of the sash arm 250 outside of the sacrificial zone 280.

The depicted illustrative embodiment of sacrificial zone 280 may include one or more stress concentration features that promote preferential deformation of the sash arm 250 within the sacrificial zone 280. One illustrative embodiment of a stress concentration feature that may be used in a sacrificial zone of a sash arm of a hinge assembly as described herein may be in the form of shoulders 282 formed in sacrificial zone 280. The shoulders 282 in the depicted illustrative embodiment of sacrificial zone 280 are used to reduce the cross-sectional area of the sash arm 250 within the sacrificial zone 280. Those features may, however, also serve as stress concentrators due to their discontinuities they provide in the shape of the sash arm 250.

The depicted illustrative embodiment of sacrificial zone 280 may also include stress concentration features to promote preferential deformation of the sash arm 250 within the sacrificial zone 280 in the form of one or more notches 284 formed in the sash arm within the sacrificial zone 280. Notches 284 may provide additional stress concentration as compressive forces are applied to the sash arm 250 along sash arm axis 251, as well as further reducing the cross-sectional area of the sash arm 250 within the sacrificial zone 280.

Figure 14:
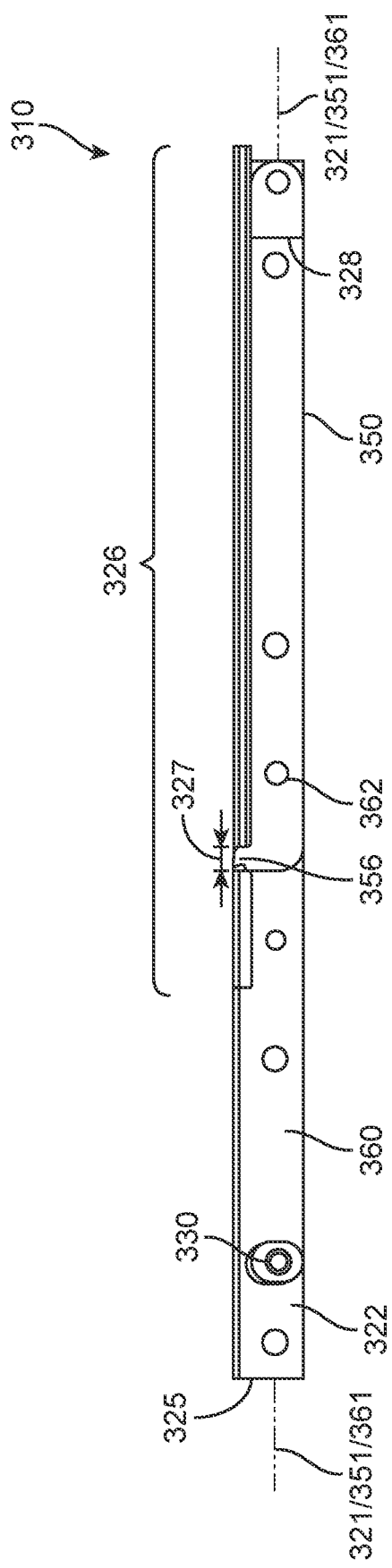
FIG. 14 is a top view of the components of another illustrative embodiment of a hinge assembly as described herein arranged as they would be when the sash to which the hinge assembly is attached is in a closed position such that the sash arm and connecting arm are aligned along the track axis of the hinge assembly.
Figure 15:
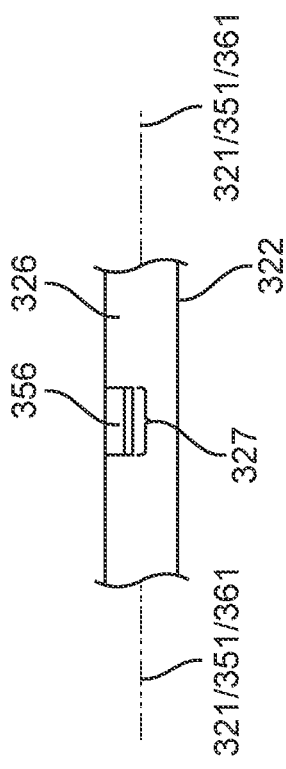
FIG. 15 is an enlarged side view of a portion of the hinge assembly of FIG. 14 including one illustrative embodiment of features provided to transfer energy from the sash arm to the track assembly.

Another alternative illustrative embodiment of a hinge assembly providing energy control is depicted in FIGS. 14-15. This depicted illustrative embodiment achieves energy control through the transfer of energy from the sash arm to the shoe track using a mechanical interlock between the sash arm and the shoe track when the hinge assembly is in the closed configuration. As discussed herein, transferring energy from the sash arm to the shoe track results in transfer of that energy to the window frame, rather than the hinge pin.

The components of the depicted illustrative hinge assembly of FIG. 14 are depicted as they would be arranged when a sash connected to the hinge assembly is in a closed configuration relative to a window frame. As depicted in FIG. 14, the sash arm 350 and connecting arm 360 are generally aligned with the track axis 321 defined by the base 322 of the track assembly. As a result, the sash arm axis 351 defined by the sash arm 350 of the hinge assembly and the connecting arm axis 361 defined by the connecting arm 360 of the hinge assembly are aligned with the track axis 321. Although depicted as perfectly aligned, some misalignment between the different axes may be acceptable when the sash to which the hinge assembly is attached is in its closed configuration.

As described in connection with other embodiments of hinge assemblies described herein, the sash arm 350 includes a shoe 328 at one end thereof, with the shoe 328 being pivotally connected to the shoe end of the sash arm 350. The track assembly of hinge assembly 310 includes a shoe track 326 aligned with and extending along the track axis 321. The shoe 328 slides along shoe track 326 when the hinge assembly is moving and attached sash between its open and closed configurations as described herein in connection with other illustrative embodiments of hinge assemblies.

The sash end of the connecting arm 360 is pivotally attached to the sash arm 350 by a pin 362 as described in connection with other illustrative embodiments of hinge assemblies described herein. The hinge assembly further includes a hinge pin 330, about which connecting arm 360 rotates when the hinge assembly is moving an attached sash between its open and closed configurations in a window frame.

Energy control in the depicted embodiment of hinge assembly 310 depicted in FIGS. 14-15 is achieved using a mechanical interlock defined by the sash arm 350 and the shoe track 326 of the track assembly. The mechanical interlock defined between the sash arm 350 and shoe track 326 is configured to fix the position of the sash arm 350 relative to the shoe track 326 along the sash arm axis 351 and the track axis 321.

When the hinge assembly 310 is in the closed configuration (as depicted in FIG. 14) a force directed along the sash arm axis 351 through the sash arm 350 is transferred from the sash arm 350 to the shoe track 326 at the mechanical interlock between the sash arm 350 and the shoe track 326. Because the shoe track 326 is attached to the window frame through base 322 of the track assembly, that same force is transferred from the sash arm to the window frame to isolate the hinge pin 330 from damage if those same forces were transmitted through connecting arm 360 to hinge pin 330.

In the depicted illustrative embodiment of hinge assembly 310, the mechanical interlock defined between the sash arm 350 and the shoe track 326 is in the form of a complementary slot and tab arrangement. In the illustrative embodiment of that mechanical interlock, the tab 356 is provided on sash arm 350 and complementary slot 327 is provided in shoe track 326. Positioning tab 356 in the complementary slot 327 provides for transfer of forces directed along the sash arm 350 to the shoe track 326 through the tab 356 and slot 327. Tab 356 is not located in slot 327 when the hinge assembly 310 is in the open configuration (see, e.g., corresponding sash arm 50 and connecting arm 60 in FIG. 2).

Although tab 356 is depicted as being provided on sash arm 350 and slot 327 is depicted as being provided in shoe track 326, many other alternative mechanical interlock structures could be provided to transfer force from the sash arm 352 the shoe track 326. For example, a tab could be provided on shoe track 326 that extends into a slot formed in sash arm 350. Other variations will be well known to those of skill in the art.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of hinge assemblies and methods are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A hinge assembly for supporting a rotating sash in a window frame, the hinge assembly comprising:
   a track assembly configured for attachment to a window frame, the track assembly comprising a base, a shoe track, and a hinge pin,
       wherein the base extends along a track axis from a hinge pin end to a shoe track end,
       wherein the shoe track extends along the track axis, and wherein the shoe track extends from the shoe track end towards the hinge pin end,
       wherein the hinge pin is connected to the base, the hinge pin defining a hinge pin axis extending through a base end and an upper end of the hinge pin;
   a shoe slidably engaged with the shoe track, wherein the shoe is configured to slide along the shoe track and the shoe is restrained from moving transverse to the track axis when the shoe is slidably engaged with the shoe track;
   a sash arm configured for attachment to a rotating sash, the sash arm extending from a shoe end to a distal end, wherein the shoe end forms a pivotal connection to the shoe, and wherein the sash arm defines a sash arm axis extending through the shoe end and the distal end; and
   a connecting arm extending from a hinge pin end to a sash end, wherein the sash end is pivotally connected to the sash arm at an intermediate location spaced from the shoe end of the sash arm, and wherein the hinge pin end of the connecting arm is pivotally connected to the hinge pin, wherein the hinge pin end of the connecting arm is located between the hinge pin upper end and the base of the track assembly;
   wherein the hinge assembly comprises a closed configuration in which the sash arm axis is aligned with the track axis and an open configuration;
   wherein the sash arm comprises a sacrificial zone configured to permanently deform in response to a compressive force directed along the sash arm axis when the hinge assembly is in the closed configuration.

2. A hinge assembly according to claim 1, wherein the sash end of the connecting arm is pivotally connected to the sash arm within the sacrificial zone.

3. A hinge assembly according to claim 2, wherein the sacrificial zone comprises a first cross-sectional area that is smaller than a second cross-sectional area of the sash arm outside of the sacrificial zone, where the first and second cross-sectional areas are measured in planes transverse to the sash arm axis.

4. A hinge assembly according to claim 3, wherein the sash arm comprises one or more stress-concentration features within the sacrificial zone.

5. A hinge assembly according to claim 4, wherein at least one stress concentration feature of the one or more stress concentration features comprises a shoulder formed along an edge of the sash arm.

6. A hinge assembly according to claim 4, wherein at least one stress concentration feature of the one or more stress concentration features comprises a notch formed into the sash arm within the sacrificial zone.

7. A hinge assembly according to claim 2, wherein the sash arm comprises one or more stress-concentration features within the sacrificial zone.

8. A hinge assembly according to claim 7, wherein at least one stress concentration feature of the one or more stress concentration features comprises a shoulder formed along an edge of the sash arm.

9. A hinge assembly according to claim 7, wherein at least one stress concentration feature of the one or more stress concentration features comprises a notch formed into the sash arm within the sacrificial zone.

10. A hinge assembly according to claim 1, wherein the sacrificial zone comprises a first cross-sectional area that is smaller than a second cross-sectional area of the sash arm outside of the sacrificial zone, where the first and second cross-sectional areas are measured in planes transverse to the sash arm axis.

11. A hinge assembly according to claim 1, wherein the sash arm comprises one or more stress-concentration features within the sacrificial zone.

12. A hinge assembly according to claim 11, wherein at least one stress concentration feature of the one or more stress concentration features comprises a shoulder formed along an edge of the sash arm.

13. A hinge assembly according to claim 11, wherein at least one stress concentration feature of the one or more stress concentration features comprises a notch formed into the sash arm within the sacrificial zone.

\* \* \* \* \*